United States Patent

Atkins et al.

Patent Number: 6,151,031
Date of Patent: *Nov. 21, 2000

[54] MAP BUILDER SYSTEM AND METHOD FOR ENABLING GENERIC INTERFACING OF AN APPLICATION WITH A DISPLAY MAP GENERATION PROCESS IN A MANAGEMENT SYSTEM

[75] Inventors: Brian J. Atkins, Fort Collins, Colo.; Ian Rose, Wavell Heights, Australia; Robert A. Potterveld, Fort Collins, Colo.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/712,229

[22] Filed: Sep. 9, 1996

[51] Int. Cl.[7] .................................................. G06T 11/20
[52] U.S. Cl. ........................................... 345/441; 345/440
[58] Field of Search .................................... 345/440, 441, 345/200.3, 200.53, 200.38, 356; 395/200.3, 200.53, 200.38, 200.33

[56] References Cited

U.S. PATENT DOCUMENTS

| | | | |
|---|---|---|---|
| 5,261,044 | 11/1993 | Dev et al. | 345/459 |
| 5,295,244 | 3/1994 | Dev et al. | 345/461 |
| 5,572,640 | 11/1996 | Schettler | 345/440 |
| 5,583,976 | 12/1996 | Bullard | 345/440 |
| 5,619,632 | 4/1997 | Lamping et al. | 345/441 |
| 5,684,967 | 11/1997 | McKenna et al. | 395/329 |
| 5,751,965 | 5/1998 | Mayo et al. | 395/200.54 |

FOREIGN PATENT DOCUMENTS

| | | | |
|---|---|---|---|
| 0 678 817 A1 | 4/1994 | European Pat. Off. | G06F 17/60 |
| 0715435A2 | 8/1995 | European Pat. Off. | H04L 12/24 |

OTHER PUBLICATIONS

Dengler, Ed. et al., "Constraint–Driven Diagram Layout", Proceedings of the Institute of Electrical and Electronics Engineers Symposium on Visual Languages: pp. 330–335, Aug. 1993.

Ridolfo, HP OpenView Network Management, HP Journal, Apr. 1990, pp. 51–53.

Jander, Network Management and Security, Data Communications International, Jan. 1993, pp. 93–94.

Primary Examiner—Mark R. Powell
Assistant Examiner—Motilewa Good-Johnson

[57] ABSTRACT

A map builder system is implemented in a topological management system in a computer system to enable generic interfacing of an application with a display map generation process. The topological management system tracks a topology of objects. The map builder system includes a map builder and a topology data repository that implements a schema. The schema comprises a series of tables containing updated topological data representing particular attributes and relationships of the objects to be depicted. The map builder interfaces the topological data within these tables with a management system application programmatic interface (API), which interfaces with applications. The map builder constructs a series of mappings from the data, and the management system API is capable of using these mappings to construct a topology representing the relevant objects. The user can view the topology from the management system API and can change the topological representation, if desired.

33 Claims, 8 Drawing Sheets

MAP BUILDER SYSTEM AND METHOD FOR ENABLING GENERIC INTERFACING OF AN APPLICATION WITH A DISPLAY MAP GENERATION PROCESS IN A MANAGEMENT SYSTEM

FIELD OF THE INVENTION

The present invention relates to the field of enterprise management systems and in particular to a computer based, object oriented, system and method for enabling generic interfacing of an application with a display map generation process in a management system for tracking a topology of objects.

BACKGROUND OF THE INVENTION

Management systems utilized in a business or other enterprise frequently apply computing systems to automate aspects of the enterprise management. Such systems manage aspects and relationships of various objects associated with the enterprise. Objects, as used herein, relates to any item to be managed by a computer based management system. Objects include, but are not limited to, examples such as hosts, bridges, segments, networks, political domains, people, organizations, and applications. A management system displays the topology of the objects within the management system. As used in this description and the appended claims, the word "topology" means a collection of objects and object relationships, and "object relationships" refer to the manner in which the objects relate to one another in the topology. Typically, the relationships defining a topology are connection, containment, and dependency. For example, where two objects are connected to one another, the topology shows a symbol for one object, another symbol for the other object, and a symbol (usually between the two objects) showing that the objects are connected. Similarly, where objects are contained in one another, the topology symbolically shows the two objects and the hierarchy of the containment. It can be appreciated by one ordinarily skilled in the art that containment is typically represented by displaying on the initial display map the object that is containing other objects. A "map" is defined as the visual topological display of a defined grouping of objects and their relationships. Once the user selects an object on the map, a new map is presented showing the objects contained within the selected object. A map of objects contained within another object can be referred to as a "submap." The objects on this submap can be selected, in the same way, showing the objects and object relationships contained therein. In this way, the hierarchy of a multitude of objects can be represented in a user friendly manner. It is the task of computer based management systems to display desired topologies to the user and to change the topologies as the objects and the relationships between them change.

Oftentimes, the data defining the object attributes and relationships are associated with a networking system. As used herein, object attributes refer to the status of the objects being displayed. An example of a network topology would be the specifications pertaining to the devices and device interconnections associated with a network. The management system should be capable of reading information from a network so the system can display the appropriate object attributes and relationships.

Historically, users desiring to have a computer based topology representation developed map applications to interact with a management system application program interface (hereinafter referred to as a management system API). A map application, as used herein, is a hard-wired programmatic approach to programmatically discover object attributes and relationships from either a computer network or outside source and to render these attributes and relationships to the management system API. The management system API is a display map generation process and displays the topological hierarchy of the object attributes and relationships. Generally, each system of objects requires a specific map application to render the object attributes and relationships to the management system API. Therefore, an implementor usually has to implement one map application to interface one topology and to implement another application to interface a different topology.

In order to successfully create map applications, an implementor learns hundreds of function calls to interface with the management system API. The training of personnel to successfully interface with a network and its management system API poses a significant cost to a potential implementor. In addition, since the map application algorithmically introduces information to the management system API, the map application has to be built, tested, and debugged. The data structures representing the different object attributes and relationships are frequently complex, and the process of creating a working algorithmic map application is expensive. These training and implementation costs represent a significant barrier to a potential implementor of the map application.

SUMMARY OF THE INVENTION

The present invention overcomes the inadequacies and deficiencies of the prior art as discussed herein. The invention provides for a map builder system and method for enabling generic interfacing of an application with a display map generation process in a management system for tracking a topology of objects.

The map builder system and method utilize a management system API, a map builder, and a topology data repository. The topology repository is any system or device that introduces data to the map builder that defines object attributes and relationships in a predefined format. In the preferred embodiment, the topology data repository is a database management system containing a relational or object oriented database called a schema. The schema is preferably comprised of a series of tables with each table containing data representing a particular object attribute or relationship. The data in these tables collectively define all of the object attributes and relationships needed to represent the topology. The map builder is interfaced with the topology data repository to acquire the updated data representing object attributes and relationships.

The map builder is configured to receive the data representation of object attributes and relationships from the topology data repository, to correlate the object attributes and relationships with the appropriate values defining the parameters of the display symbols, and to generically interface the updated object attributes and relationships with the management system API. The management system API, in turn, displays the updated object attributes and relationships to the user. Accordingly, the management system API continuously displays an updated topology.

The map builder is also configured to receive presentation mapping information which defines how the objects and their relationships will be displayed by the management system API. By introducing this presentation mapping information to the map builder, the user controls the display of the symbols representing the topological data.

In accordance with another feature of the invention, the map builder may include a presentation manager and a topology manager. The topology manager is capable of receiving data in a predefined format. The presentation manager is configured to translate this data into a form that can be interfaced with the management system API. The topology manager uses the translated data to make a function call which contains all the necessary information to instruct the management system API how to make a desired presentation change. By relaying function calls to the management system API that reflect changes in object attributes and relationships, the topology displayed to the user can continuously be updated to show the current status of the objects.

The map builder and method of the invention have many advantages, a few of which are delineated hereafter, as examples.

An advantage of the map builder and method of the invention is that they provide a scheme for interfacing data representing object attributes and relationships with a management system API. This interfacing ability abolishes the need to design a hard wired programmatic approach to define object relationships. Instead, object attributes and relationships are represented in data which is translated by the map builder into a function call for a management system API. Therefore, rather than constructing different map applications to represent different topologies, different topologies can be generically represented through a single map builder system. Consequently, costs of successfully building and implementing a topology system is significantly reduced.

Another advantage of the map builder and method of the invention is that they provide for a flexible and user friendly scheme for changing or expanding the objects represented by the topology once the system is in place.

Another advantage of the map builder and method of the invention is that they provide a scheme for testing a topological representation system on a much shorter time scale over the current algorithmic approach. This allows consumers to test the viability of a topology system at a relatively low cost.

Other features and advantages of the invention will become apparent to one skilled in the art upon examination of the following drawings and detailed description. It is intended that all such additional features and advantages be included herein within the scope of the invention, as is defined by the claims.

BRIEF DESCRIPTION OF THE DRAWINGS

The invention can be better understood with the reference to the following drawings. The elements of the drawings are not necessarily to scale, emphasis instead being placed upon clearly illustrating principles of the invention. Furthermore, like reference numerals designate corresponding parts throughout the several views.

DETAILED DESCRIPTION OF THE PREFERRED EMBODIMENT

Figure 1:
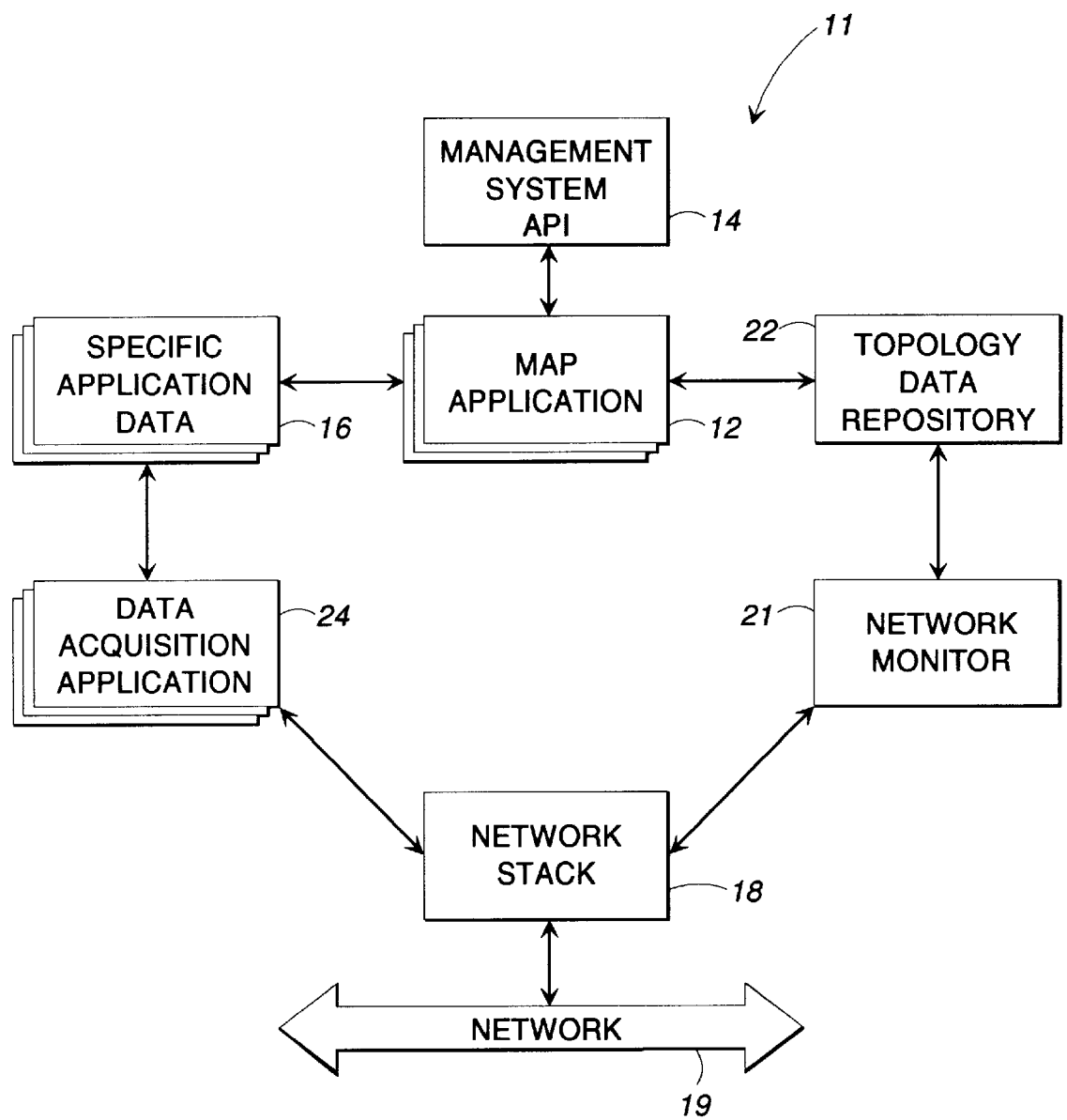
FIG. 1 is a block diagram illustrating a possible implementation of a topological management system in accordance with the prior art.

With reference to FIG. 1, in a typical topological management system 11 of the prior art, a user creates a map application 12 which programmatically understands the relationships among objects. Using this hard-wired understanding about the relationships among the defined objects of the topology as well as object data, the map application 12 renders the object attributes and relationships to a management system application programmatic interface (API) 14. The management system API 14 then uses the information from the map application to display a topological representation of the objects. The use of a management system API to display topological representations is widely known in the industry.

The existence and status of the objects of the topology can be discovered through a network stack 18. Generally, the network stack 18 is the collection of network software in the operating system (o/s) that provides access to the network 19. The network stack 18 includes, among other things, protocol software for implementing the Internet Protocol (IP), the Transmission Control Protocol (TCP), and the Simple Network Management Protocol (SNMP).

The network monitor 21 transmits and receives data packets to and from the network 19 by way of the network stack 18. The network monitor essentially discovers and monitors network topology in the network 19. When network topology changes occur on the network 19, the network monitor 21 generates events, or traps (SNMP vernacular), which include an object identifier and object change information. The network monitor 21 receives events from devices, such as a router, over the network 19.

The network monitor 21 relays generic data information of object attributes and relationships to be stored to a database management system called the topology data repository 22. Generally, the network monitor 21 notifies the topology data repository of events (topology changes).

The topology data repository 22 is configured to contain data on the status of object attributes and their relationships in the topology. If the user wishes to have access to specific information pertaining to objects of the topology not supplied by the network monitor 21, then the user must create a data acquisition application 24 to read the appropriate information from the network stack 18. The user stores this information in a database referred to in FIG. 1 as specific application data 16. The map application 12 uses the specific application data 16, in conjunction with the generic information in the topology data repository 52, to programmatically define the relationships among the objects of the topology.

Figure 2:
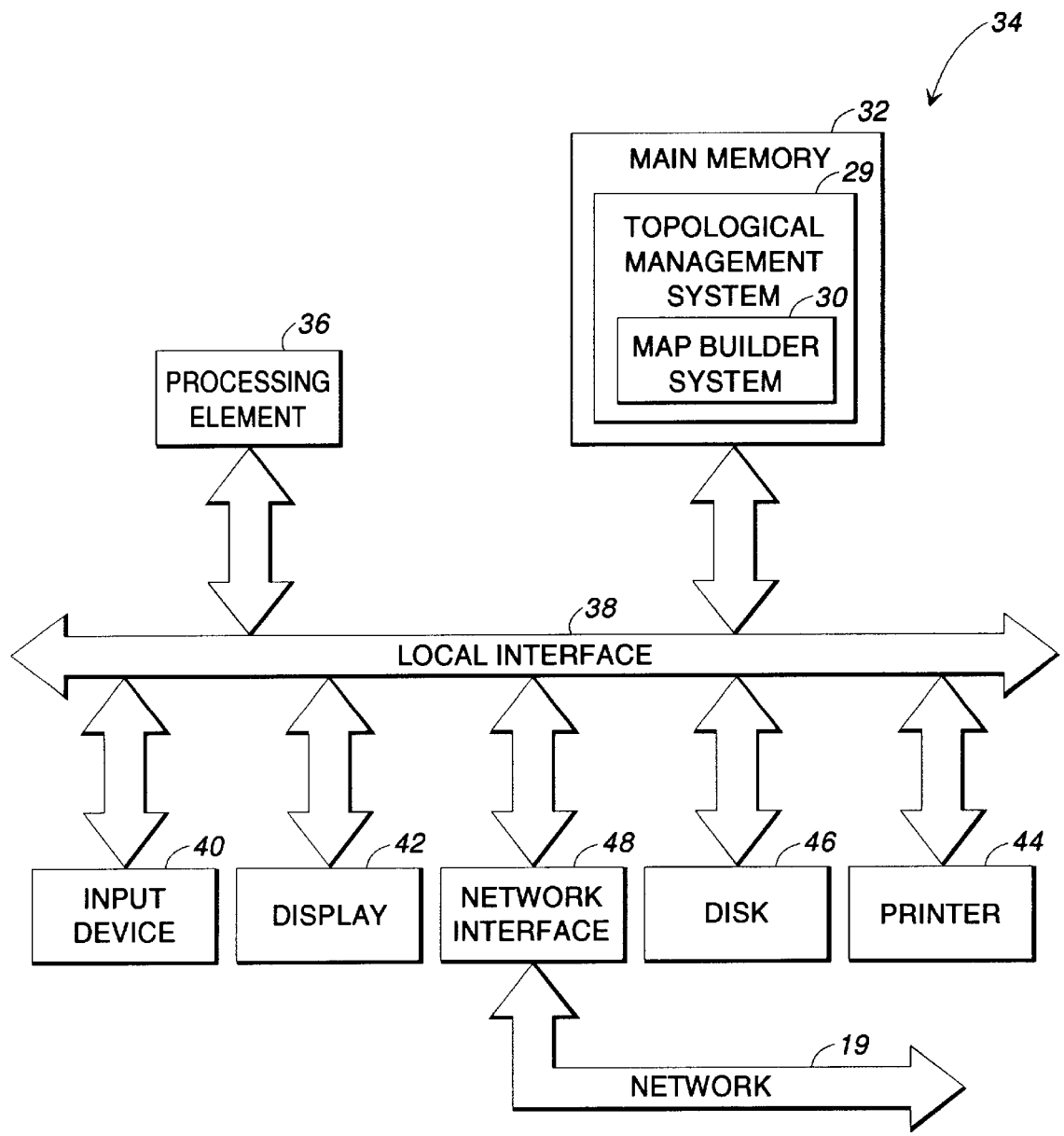
FIG. 2 is a block diagram illustrating a possible implementation of a computer that employs a topological management system having a map builder system in accordance with the present invention.

As illustrated by way of example FIG. 2, the map builder system 30 of the invention along with its associated methodology can be employed within a topological management system 29 stored in the main memory 32 of a computer system 34. Note that the map builder system 30 can be stored on any computer-readable medium for use by or in connection with a computer-related system or method. In the context of this document, a computer-readable medium is an electronic, magnetic, optical, or other physical device or means that can contain or store a computer program for use by or in connection with a computer-related system or method. As an example, the map builder system 30 may be magnetically stored and transported on a conventional portable computer diskette.

The computer system 34 of FIG. 2 comprises a conventional processing element 36 that communicates to the other elements within the computer system 34 via a local interface 38, which can include one or more buses. An input device 40, for example, a keyboard or a mouse, can be used to input data from a user of the system 34, and a screen display 42 or printer 44 can be used to output data to the user. A disk storage mechanism 46 can be connected to the local interface 38 to transfer data to and from a nonvolatile disk (e.g., magnetic, optical, etc.). The system 34 is preferably connected to a network interface 48 that allows the system 34 to exchange data with the network 19.

Figure 3:
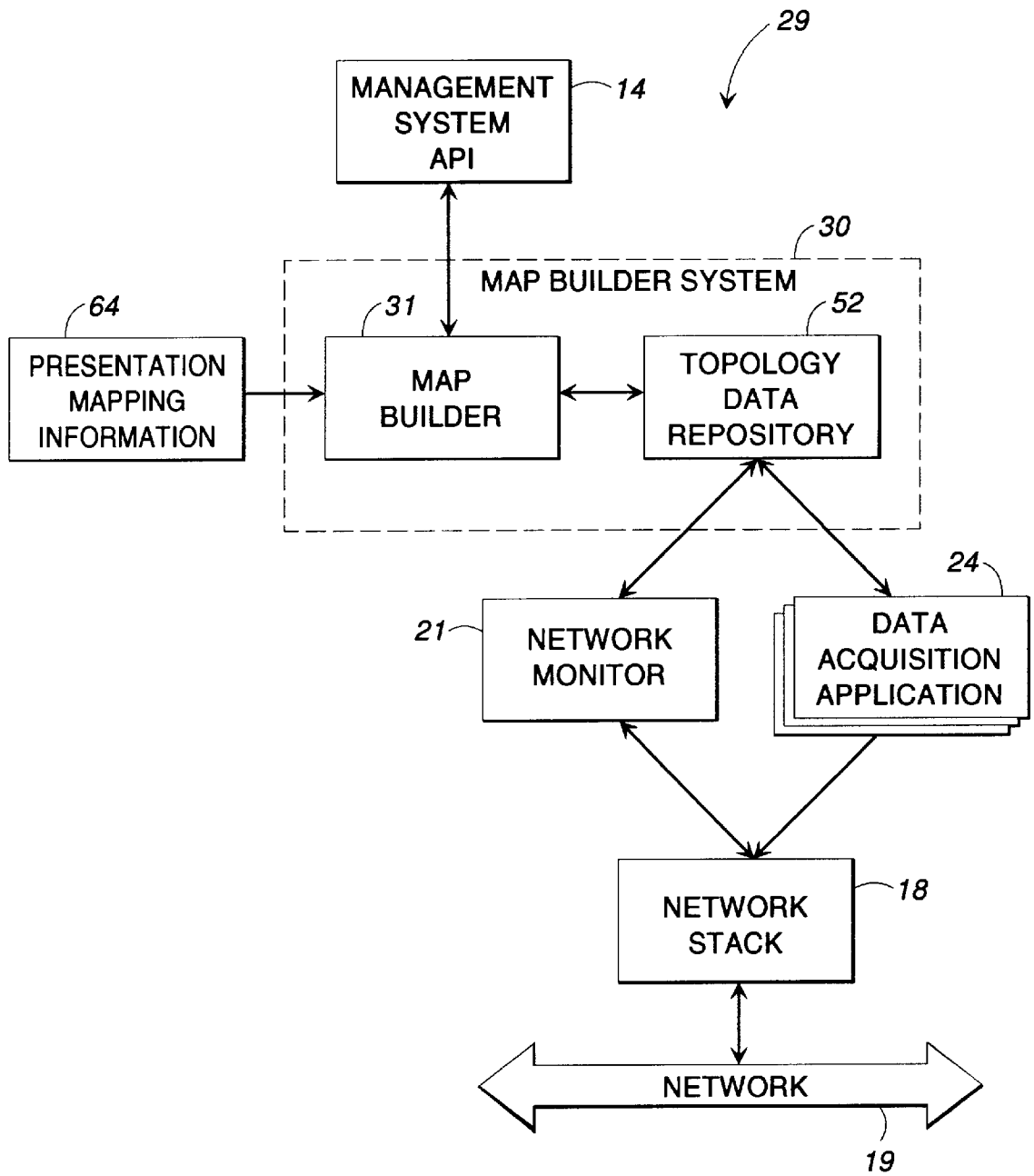
FIG. 3 is a block diagram illustrating a possible implementation of the topological management system of FIG. 2.

The map builder system 30 of the present invention eliminates the need for a user to create a map application 12 (FIG. 1) and to store specific application data 16 (FIG. 1). Instead of programmatically capturing relationships among objects in the algorithms of the map application 12, data representing object attributes and relationships in a predefined format can be stored in a topology data repository 52, as shown in FIG. 3. The data representing object attributes and relationships is referred to herein as "topological data." As long as the format of the topological data is recognizable to the map builder system 30, the map builder system 30 can interface the data with the management system API 14. The management system API 14 can then display the topology to the user.

Referring to FIG. 3, the map builder system 30 comprises a map builder 31 in communication with a topology data repository 52. The map builder 31 serves as the primary interface between the system 30 and the management system API 14 as well as between the system 30 and presentation mapping information 64, which is described hereafter. Further, the topology data repository 52 includes an application programmatic interface and serves as the primary interface between the system 30 and a network monitor 21 as well as between the system 30 and a data acquisition application 24, which components are also further described hereafter.

The network monitor 21 is a generic data acquisition application. As in the prior art, the network monitor 21 of the present invention is configured to monitor the network 19 via the network stack 18 for changes in certain generic topological data and to relay these changes to a database in the topology data repository 52. The topological data in the topology data repository 52 is updated to indicate the current state of the objects. The map builder system 30 interfaces the new topological data with the management system API 14 where a new display is shown. The system and method of interfacing the new topological data will be discussed in further detail later in this document with reference to FIGS. 6 through 8. As a result of the interfacing of new topological data, the display in the management system API 14 continuously indicates current object attributes and relationships.

If the user wishes to have the topology reflect changes in object attributes and relationships that are not subject to the generic monitoring of the network monitor 21, then the user updates the topological data in the topology data repository 52 with the user's own data acquisition application 24. The data acquisition application 24 is an application program that reads changes in specific data of the network stack 18 not monitored in the network monitor 21 and relays these changes to the topology data repository 52. The topology data repository 52 updates the database containing the topological data, and the map builder 31 interfaces this new data with the management system API 14, which displays the updated topology.

It should be noted that although the preferred embodiment includes a topology data repository 52 to introduce topological data to the map builder 31, other devices and/or methods may be used. Any device or method that relays updated topology data to the map builder 31 in a predefined format compatible with the map builder 31 is sufficient for the operation of the present invention.

The presentation mapping information 64 is written by the user and contains the data defining "mappings" which are used to control the parameters of the features on the display screen of the management system API 14. A mapping, as used herein, is a set of data values that define the parameters of a feature, and a feature is defined as a symbolic display of a particular object attribute or relationship. Examples of features include, but are not limited to, icons, maps, submaps and relationship symbols. The term "parameter", as used herein, refers to the type of symbol used to represent an object attribute or relationship. A parameter typically relates to the size of the symbol, the colors of the symbol, the behavior of the symbol when selected by the user, and many other like qualities. Consequently, by controlling the data defining the mappings, the user controls the parameters of the features used to display the object attributes and relationships of the topology.

Figure 4:
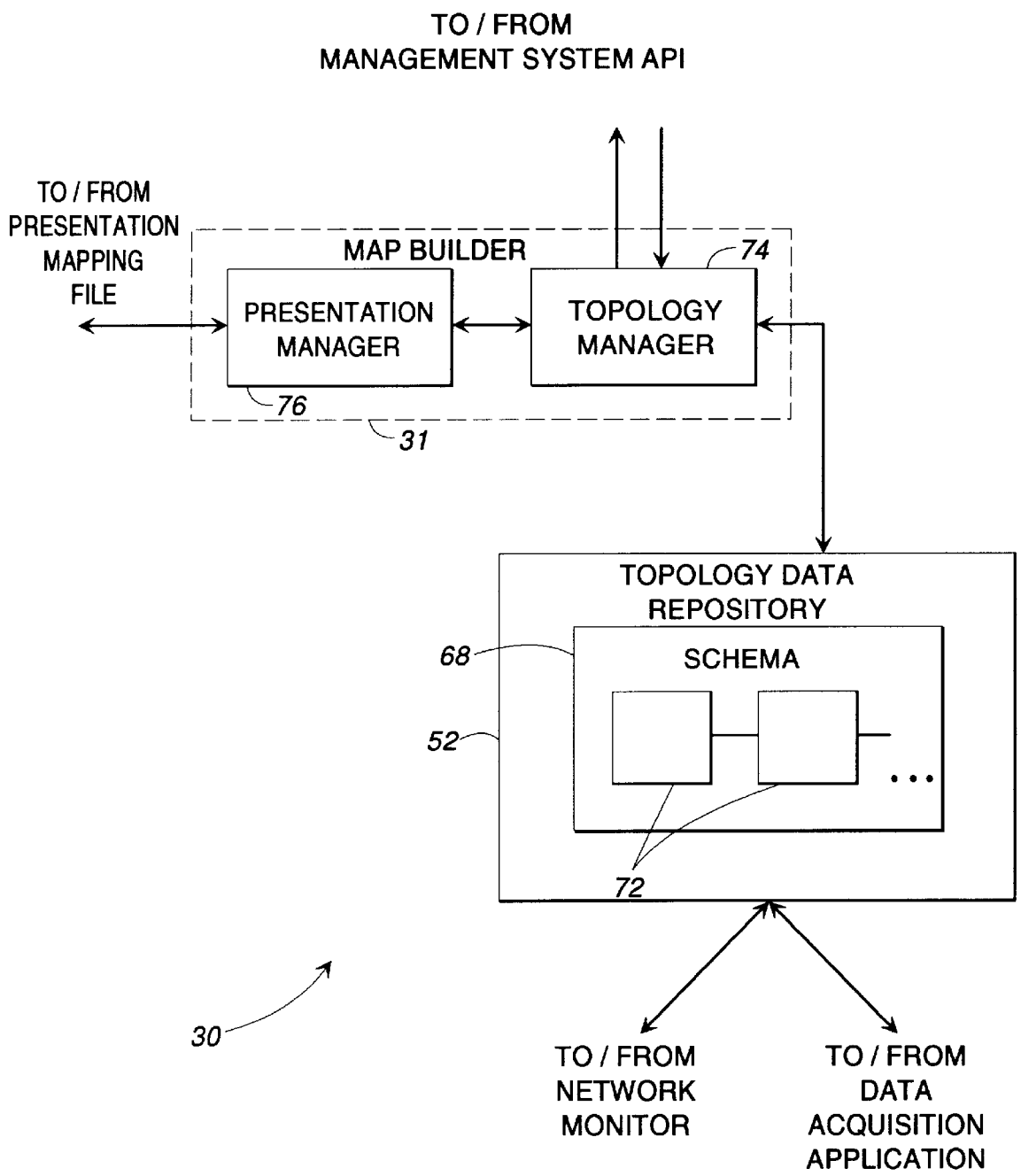
FIG. 4 is a block diagram illustrating a possible implementation of the map builder system of FIG. 3.
Figure 5:
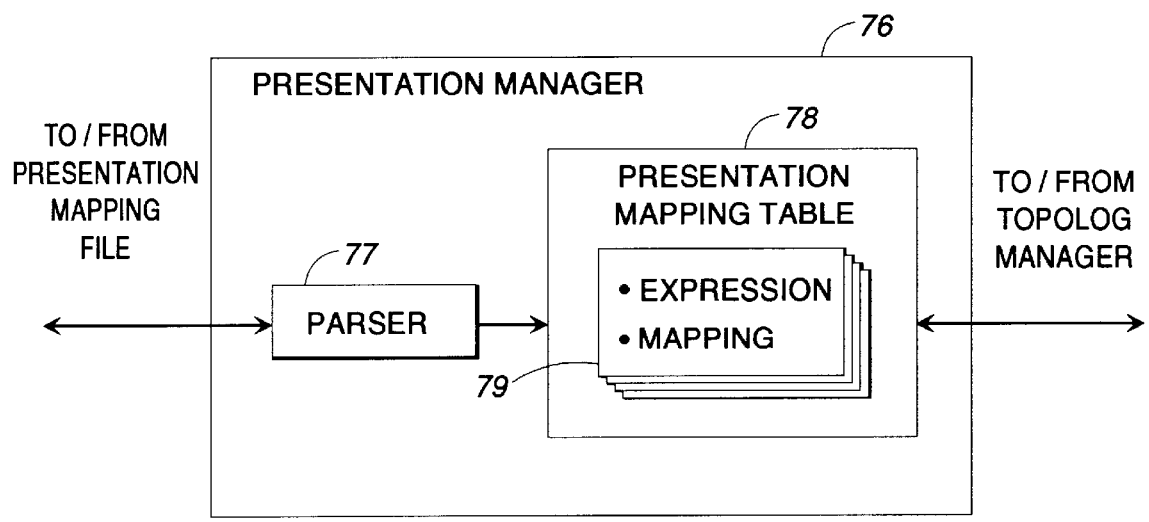
FIG. 5 is a block diagram illustrating a possible implementation of a presentation manager of FIG. 4.

Referring to FIG. 4, the topology data repository 52 can employ a relational, object oriented, or other suitable database management system. Preferably located within the topology data repository 52 is a relational, object oriented, or other applicable database, called a schema 68, which contains the data representing the object attributes and relationships displayed by the system 11. The preferred embodiment of the schema 68 is a series of interconnected data tables 72 with each table 72 containing the data representing a particular object attribute or relationship. For example, if object A is contained within object B, there could be data in one table representing A, and there could be data in another table representing B. There could also be data in a third table representing the relationship that A is contained within B. It can be appreciated by one ordinarily skilled in the art that a given table can contain more than one attribute such that, for example, a single table could contain the data representing B and the data representing the relationship between A and B. The data within the schema 68 defining object attributes and relationships is in a predefined format compatible with the map builder 31.

As further illustrated in FIG. 4, the data within the schema 68 can be relayed to the map builder 31, which preferably comprises a topology manager 74 and a presentation manager 76. The topology manager 74 is an application program that receives changes in topological data and converts these changes into a "map edit." A map edit is the updated information defining how the display is to be changed in order to reflect the changes in topological data by disclosing whether to delete or add an object symbol or connection symbol and by disclosing whether to represent an object attribute change. Before the map edit can be used to change the topological display from the management system API 14, parameter values should be correlated with the map edit to define the size, shape, color, etc. of the display symbol (feature) that is to be changed. However, the topological data received by the topology manager 74 is not of the form that can be interfaced directly with the management system API 14. Therefore, the presentation manager 76 translates this data into a mapping (a set of values defining feature parameters) that can be used in a function call to the management system API 14. Each mapping contains the data values required to define a particular feature parameter. In order for translation into a mapping to occur, the user creates and presents the presentation mapping information 64 to the presentation manager 76. The presentation mapping information 64 contains the mappings that are to be used by the map builder 31, and each mapping in the presentation mapping information 64 is related to a particular expression. Each expression with its related mapping define a "mapping entry" 79 as used herein. The presentation manager 76 passes the presentation mapping information 64 through a parser 77 (if the form of the presentation mapping information 64 is not compatible with the presentation manager 76) and stores each mapping entry 79 into a database called the presentation mapping table 78. The presentation manager 76 compares the topological data received by the topology manager 74 with the expressions in the presentation mapping table 78 until the data representing an object attribute or relationship matches an expression. Once a match occurs, the values of the mapping corresponding to the matched expression are accessed and retrieved by the presentation manager 76. The topology manager 74 correlates the retrieved mapping with the map edit to define an appropriate function call. A function call with the appropriate mapping correlated to a particular map edit is defined herein as a "map edit request." The map edit request, when relayed to the management system API 14, contains the necessary information to display the appropriate features representing the objects of the topology. Accordingly, the display produced by the management system API 14 reflects or tracks the status of the objects within the topology.

In addition to receiving a topology change from the topology data repository 52, the map builder 31 can also receive a change to the topology display from the presentation mapping information 64. The presentation manager 76 can programmatically discover any change to the data within the presentation mapping information 64. Once this occurs, the presentation manager 76 reparses the data within the presentation mapping information 64, if required, and rebuilds the presentation mapping table 78 where each expression corresponds to a current mapping. The topology manager 74 then tests the data of each object attribute and relationship being represented on the screen against the expressions in the presentation mapping table 78 and uses the current mappings of the matching expressions to redisplay the topology. By rebuilding the presentation mapping table 78 with current mappings every time the user introduces a change to the presentation mapping information 64, the map builder 31 continuously updates the display from the management system API 14. Accordingly, the management system API 14 continuously displays a current topology of various object attributes and relationships.

The preferred use and operation of the map builder 30 and associated methodology are described hereafter.

Figure 6:
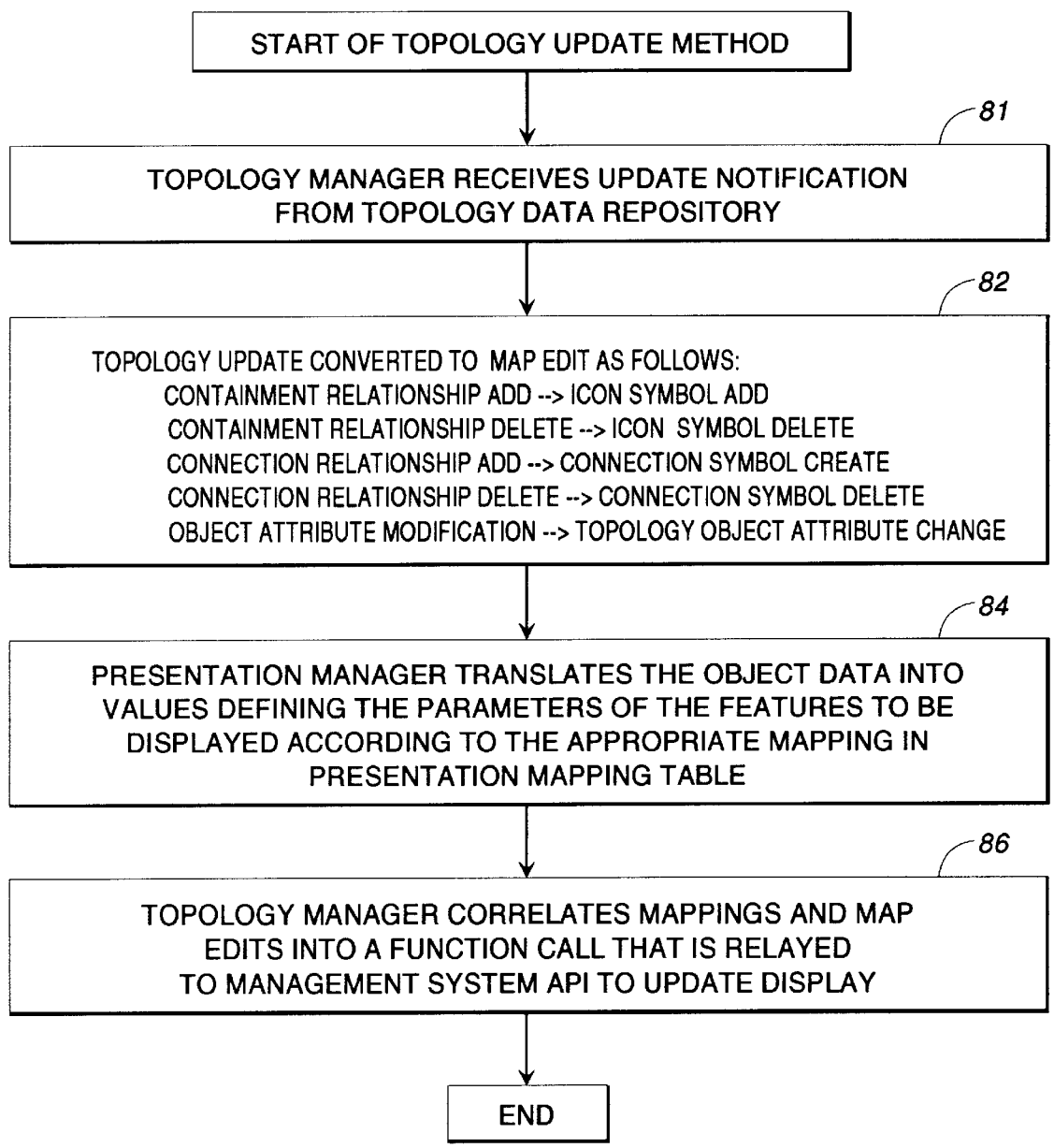
FIG. 6 is a flow chart illustrating a possible method for updating the topology in the map builder system of FIG. 3 due to a change in topology data in the topology data repository.

The user introduces the presentation mapping information 64 to the presentation manager 76 and, if necessary, implements a data acquisition application 24. The data in the presentation mapping information 64 controls the display of the features according to FIG. 8 which will be discussed further hereinbelow. The data acquisition application 24, if implemented, populates the topology data repository 52 with specific topological data while the network monitor 21 populates the topology data repository 52 with generic topological data. The topological data from the topology data repository 52 is used to create a topology display according to the topology update method of FIG. 6. With reference to FIG. 6, first, the topological data in the topology data repository 52 is acquired by the map builder 31 as indicated by block 81. The topology manager 74 of the map builder 31 programmatically converts the topological data to map edits according to block 82. As indicated in block 84, the presentation manager 76 translates object data within the topology manager 74 into values that define the feature parameters and that can be interfaced with the management system API 14. The presentation manager 76 accomplishes this translation by comparing the object data against the expressions in the presentation mapping file 64 until an expression matches the object attribute or relationship. Once this occurs, the mapping corresponding to the matched expression is used in conjunction with the map edit to programmatically define a function call (or map edit) as indicated in block 86. The function call, when received by the management system API 14 alters the display of the topology reflecting the topology change. Accordingly, the management system API 14 displays an updated display of the topology.

Once the user introduces the presentation mapping information 64 to the presentation manager 76 and the topology data repository 52 is populated with topological data, the map builder 31 and management system API 14 construct a topology display according to the method of FIG. 6 as discussed above. However, the objects being represented by the topology display may change within the network 19. In this regard, the network monitor 21 or data acquisition application 24 discovers any change to the objects and injects data reflecting such change into the topology data repository 52, and the process of FIG. 6 is repeated. First, the topology manager 74 receives the updated data and creates a map edit according to block 82. The presentation manager 76 then translates the object data into a mapping by testing expressions within the presentation mapping table 78 with the object data. The topology manager 74 then correlates the appropriate mapping with the map edit to generate an appropriate function call that alters the display when received by the management system API 14. As a result, the topology display by the management system API 14 reflects changes that occur to the objects in the network 19.

Figure 7:
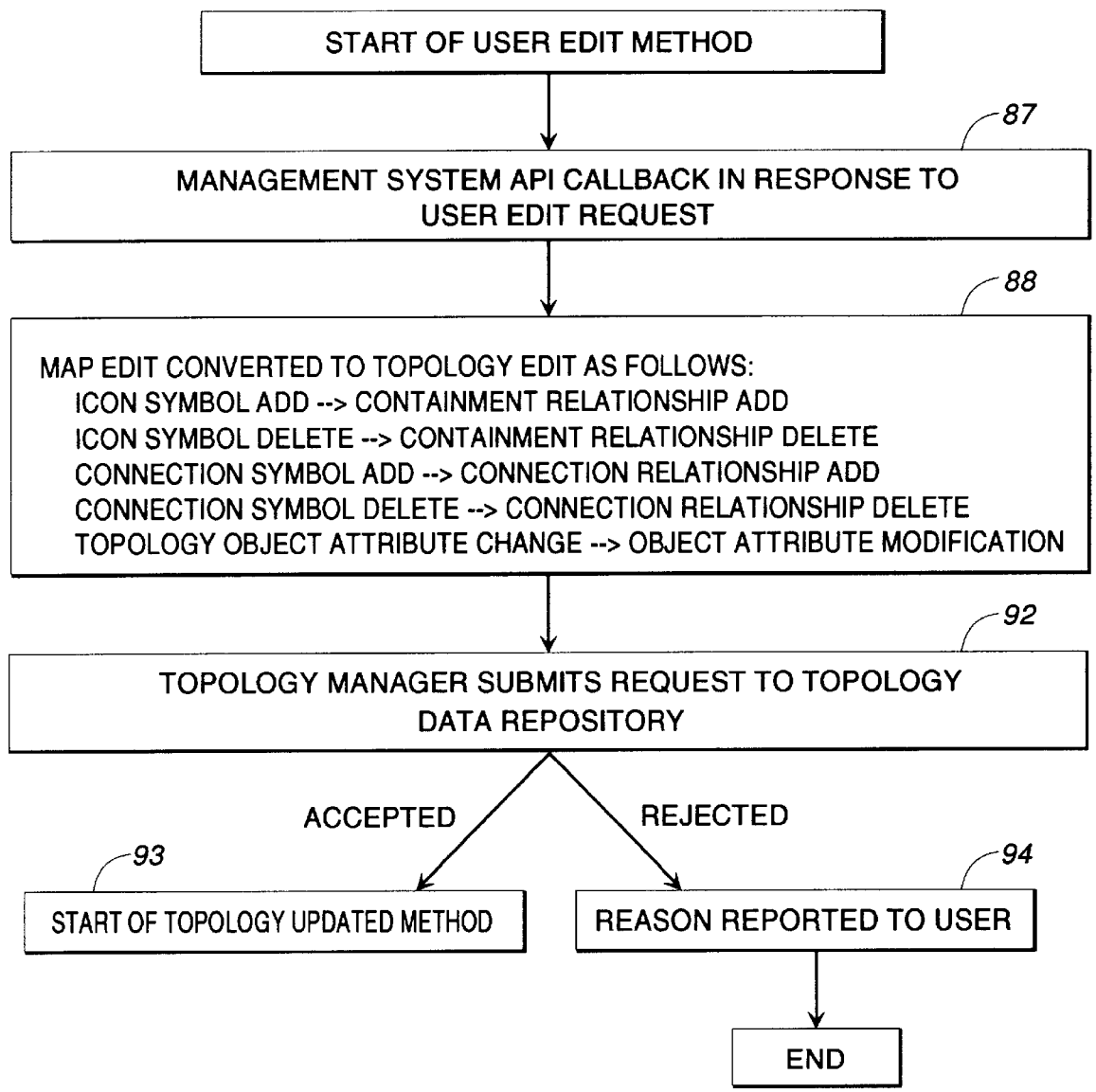
FIG. 7 is a flow chart illustrating a possible method for updating the topology in the map builder system of FIG. 3 due a change in topology data resulting from a user request.
Figure 8:
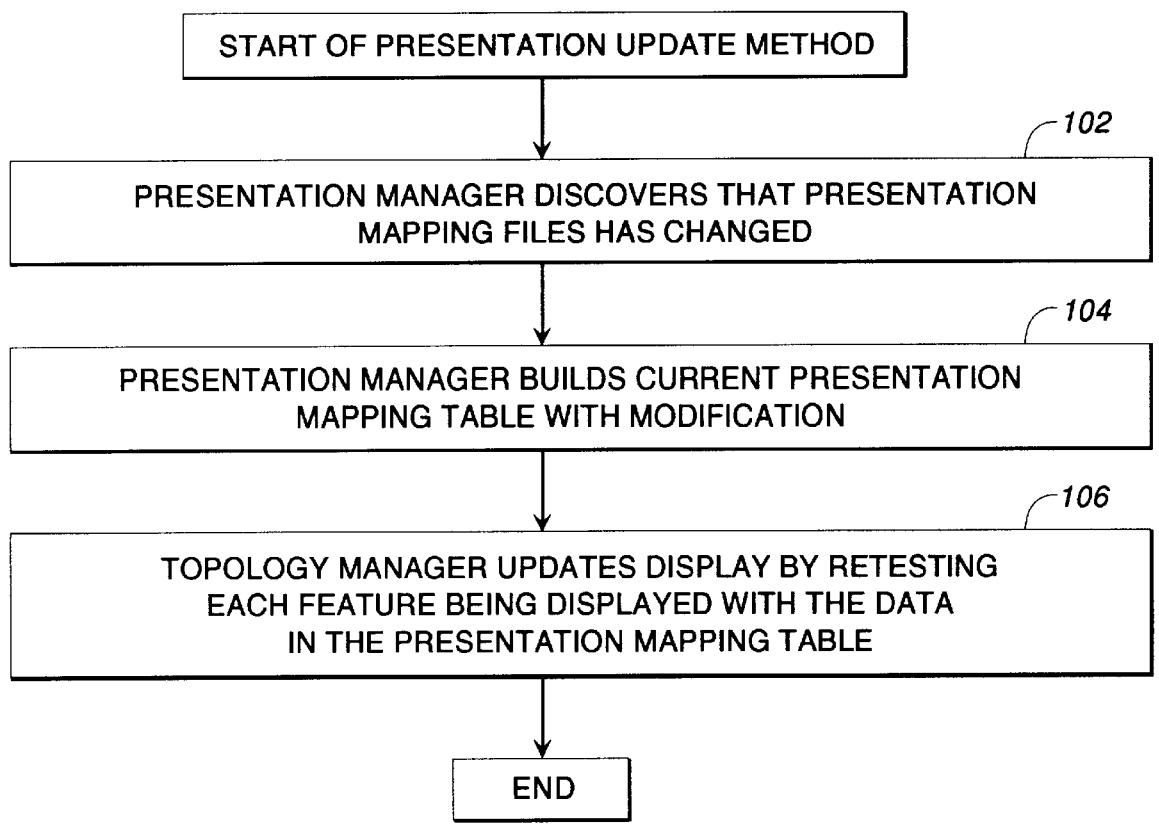
FIG. 8 is a flow chart illustrating a possible method for updating the topology due to a change in topology data resulting from the presentation mapping file.

Furthermore, the user may edit the topology even though the network monitor 21 or data acquisition application 24 do not inject any change into the topology data repository 52. Referring to FIG. 7, the user requests a change through the management system API 14 using an appropriate input device such as a mouse or a keyboard. As indicated by block 87, the topology manager 74 receives the request, called a user edit request, and converts the request to a topology edit according to block 88. A topology edit is data representing a change in the topology in a format readable by the topology data repository 52. As shown by block 92, the topology edit is relayed to the topology data repository 52 and is programmatically accepted or rejected according to preprogrammed rules defined within the topology data repository 52. If the request is rejected, the topology data repository 52 relays the reason for the rejection to the management system API 14 via the topology manager 74 as indicated by block 94. If the request is accepted, the topology data repository 52 alters the topological data within the schema 68 and sends the topological data reflecting the requested change back to the topology manager 74 to repeat the process outlined in FIG. 6. The change in topological data is again converted to a map edit by the topology manager 74 according to block 82 and the presentation manager 76 translates the change in object data into a mapping by testing expressions within the presentation mapping table 78 with the object data. The topology manager 74 then correlates the appropriate mapping with the map edit to generate a function call (or map edit request) that alters the display when received by the management system API 14. As a result, the topology display by the management system API 14 reflects changes that are requested by the user and that are accepted by the topology data repository 52.

In addition to changing the object attributes and relationships, the user can change the manner in which those attributes and relationships are depicted. The user changes the data in the presentation mapping information 64, and, referring to block 102 in FIG. 8, the presentation manager 76 programmatically discovers that the presentation mapping information 64 has been changed. After passing the modified data through a parser 82, if required, the presentation manager 76 reconstructs a current presentation mapping table 78 in block 104. The topology manager 74 then tests the data of each object being displayed against the expressions in the presentation mapping table 78 until there is a match. The topology manager 74 then uses the current mapping of the matched expression to relay a function call to redraw the objects reflecting the current mapping. Therefore, the features of the management system 14 are updated.

As a result, the topology system 29 of the present invention continuously changes whether the objects within the network 19 change, whether the user requests an acceptable change to the topology, or whether the user modifies the manner in which the features are to be presented. Accordingly, the topological display presented by the management system API 14 continuously reflects the status of the desired topology.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims. Finally, in the claims hereafter, it should be emphasized that the structures, materials, acts, and equivalents of all "means" elements, "logic" elements, and steps are intended to include any structures, materials, or acts for performing the functions specified in connection with said elements.

Wherefore, the following is claimed:

1. A map builder system for enabling generic interfacing of an application with a display map generation process in a management system for tracking a topology of objects, the system comprising:

a topology data repository configured to provide topological data;

a database having a table of mapping entries, each of said entries including an expression that defines whether said topological data corresponds to said entry and including a mapping, said mapping defining a feature to be displayed by said display map generating process; and a map builder interfaced with said topology data repository and said display map generation process, said map builder configured to receive said topological data, to compare said expression of at least one of said entries with said topological data, to correlate said topological data with said at least one entry based on said expression, to retrieve a mapping included within said at least one entry in response to a determination that said topological data is correlated with said at least one entry, and to produce a map edit request based on said mapping included within said at least one entry.

2. The system of claim 1, wherein said topological data includes object attributes.

3. The system of claim 1, wherein said topological data represents a display change.

4. The system of claim 1, wherein said topological data represents a topology change.

5. The system of claim 1, further comprising:

an application programmatic interface in communication with said map builder and configured to receive a user edit request from an application program and to receive said map edit request from said map builder.

6. The system of claim 1, wherein said topology is a network topology.

7. The system of claim 1, wherein said topology is an organizational topology.

8. The system of claim 1, wherein said topology is a client server application topology.

9. The system of claim 1, wherein said map builder is further configured to receive presentation information and to dynamically update said mapping entries based on said presentation information.

10. The system of claim 1, wherein said map builder is further configured to correlate said topological data with said at least one mapping when said expression matches said topological data.

11. The system of claim 1, wherein said topological data includes object relationships.

12. The system of claim 11, wherein said object relationships include containment, connectivity, and dependency.

13. The system of claim 1, wherein said topology data repository includes an application programmatic interface for acquiring said topological data.

14. The system of claim 13, further comprising an application program in communication with said application programmatic interface, said application program configured to provide said topological data via said application programmatic interface to said map builder.

15. The system of claim 1, wherein said topology data repository includes a predefined schema.

16. The system of claim 15, wherein said schema comprises a relational database.

17. The system of claim 15, wherein said schema comprises an object oriented database.

18. A computer-readable medium having a computer program, said computer program comprising:

a topology data repository configured to receive and store object attribute data and object relationship data, said object relationship data defining a relationship between a first object and a second object;

a data acquisition application configured to monitor a topology of objects and to update said object relationship data;

a database having a plurality of mappings, each of said mappings respectively associated with a different expression; and a map builder interfaced with said topology data repository and said database, said map builder configured to receive said object relationship data, to compare said object relationship data to an expression associated with one of said mappings, to retrieve said one mapping when said expression associated with said one mapping corresponds with said topological data, and to produce a map edit request based on said retrieved mapping, wherein said retrieved mapping corresponds to a relationship symbol.

19. A map builder method for creating a display map pertaining to a topology of objects, comprising the steps of:

maintaining presentation information in a presentation mapping database, said presentation information including mappings, each of said plurality of mappings defining a parameter of an object feature;

defining a relationship between a first object and a second object via topological data;

selecting a first mapping within said presentation information based on said relationship;

displaying a first relationship symbol between a symbol representing said first object and a symbol representing said second object, said first relationship symbol based on said first mapping; and dynamically updating said presentation information.

20. The method of claim 19, further comprising the step of acquiring said change in said topological data by way of an application programmatic interface.

21. The method of claim 19, further comprising the step of defining object relationships with specifications pertaining to containment, connectivity, and dependency.

22. The method of claim 19, further comprising the steps of:

receiving a user edit request from an application programmatic interface; and converting said user edit request into said change in said topological data.

23. The method of claim 19, wherein said topology is a network topology.

24. The method of claim 19, wherein said topology is an organizational topology.

25. The method of claim 19, wherein said topology is a client server application topology.

26. The method of claim 19, wherein said change in said topological data represents a topology change.

27. The method of claim 19, wherein said change in said topological data represents a display change.

28. The system of claim 19, wherein said plurality of mappings are generic.

29. The method of claim 19, further comprising the step of acquiring said change in said topological data by way of a predefined schema.

30. The method of claim 29, further comprising the step of implementing said schema with a relational database.

31. The method of claim 29, further comprising the step of implementing said schema with an object oriented database.

32. A map builder method for creating a display map of a hierarchical topology of objects, comprising the steps of:

representing topological data in a predefined schema that defines object attributes and object relationships including containment, connectivity, and dependency;

maintaining a database having a plurality of entries, said entries including mappings and expressions, each of said expressions defining whether a respective one of said entries corresponds to said topological data, each of said entries respectively including one of said mappings;

receiving changes in said topological data;

comparing said topological data to said expressions;

selecting one of said entries based on said comparing step;

retrieving one of said mappings from said one entry selected in said selecting step; and producing an updated display map based on said one mapping retrieved in said retrieving step.

33. The method of claim 32, further comprising the steps of:

receiving presentation information; and updating said entries with said presentation information.

* * * * *